United States Patent [19]

Nagashima

[11] Patent Number: 4,992,888
[45] Date of Patent: Feb. 12, 1991

[54] IMAGE READING APPARATUS USING A MOTOR AND CONTROLLING DRIVING PULSES SUPPLIED TO THE MOTOR

[75] Inventor: Nao Nagashima, Yokohama, Japan

[73] Assignee: Canon Kabushiki Kaisha, Tokyo, Japan

[21] Appl. No.: 917,549

[22] Filed: Oct. 10, 1986

[30] Foreign Application Priority Data

| Oct. 18, 1985 | [JP] | Japan | 60-233033 |
| Oct. 18, 1985 | [JP] | Japan | 60-233034 |
| Oct. 18, 1985 | [JP] | Japan | 60-233035 |

[51] Int. Cl.[5] ............................... H04H 1/36
[52] U.S. Cl. .................... 358/410; 358/494; 358/497
[58] Field of Search ............... 358/77, 265, 287, 285, 358/293, 294, 410, 451, 471, 474, 482, 483, 486, 494, 496, 497, 498

[56] References Cited

U.S. PATENT DOCUMENTS

| 4,217,611 | 8/1980 | Ogawa | 358/294 |
| 4,296,441 | 10/1981 | Ogasawara | 358/293 |
| 4,423,439 | 12/1983 | Watanabe | 358/287 |
| 4,636,869 | 1/1987 | Tomohisa et al. | 358/287 |
| 4,651,222 | 3/1987 | Gokita | 358/293 |
| 4,652,936 | 3/1987 | Hatayama | 358/287 |
| 4,658,302 | 4/1987 | Sakamoto | 358/293 |
| 4,663,672 | 5/1987 | Sakamoto | 358/294 |
| 4,667,951 | 5/1987 | Honjo et al. | 271/259 |
| 4,683,499 | 7/1987 | Kuwabara | 358/265 |

FOREIGN PATENT DOCUMENTS

| 55-127763 | 10/1980 | Japan | 358/287 |
| 55-156469 | 12/1980 | Japan | 358/287 |
| 59-30357 | 2/1984 | Japan | 358/287 |
| 77765 | 5/1984 | Japan | 358/287 |
| 96068 | 5/1985 | Japan | 358/287 |
| 114082 | 6/1985 | Japan | 358/287 |
| 165176 | 8/1985 | Japan | 358/287 |
| 254872 | 12/1985 | Japan | 358/287 |

*Primary Examiner*—Edward L. Coles, Sr.
*Attorney, Agent, or Firm*—Fitzpatrick, Cella, Harper & Scinto

[57] ABSTRACT

An image reading apparatus which is capable of arbitrarily varying the image magnification, utilizing a line image sensor. The sensor is moved by a stepping motor, the phase of which is controlled by the synchronization signal of the line image sensor. For example, the frequency of the pulses may be controlled, or the number of pulses supplied may be converted on the basis of an error between the number which were to be supplied and the number actually supplied.

20 Claims, 4 Drawing Sheets

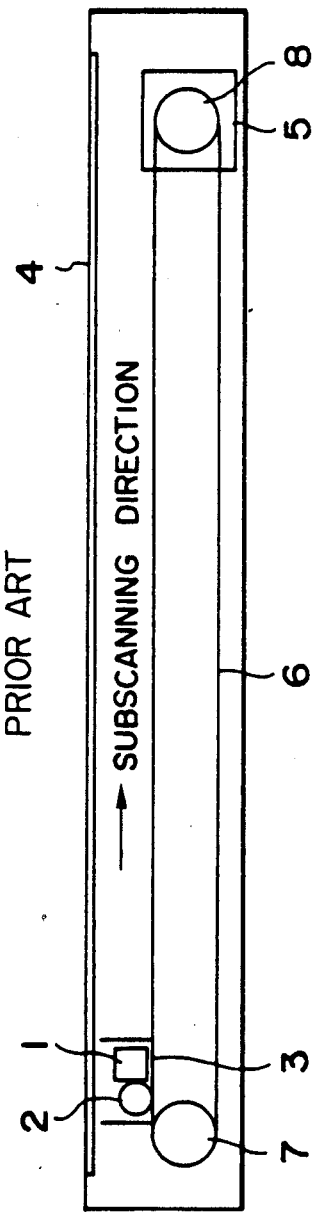
FIG. I
PRIOR ART
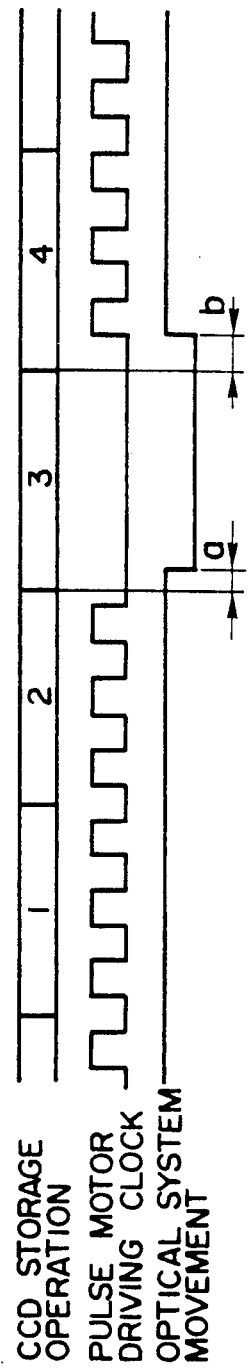
FIG. 2
PRIOR ART

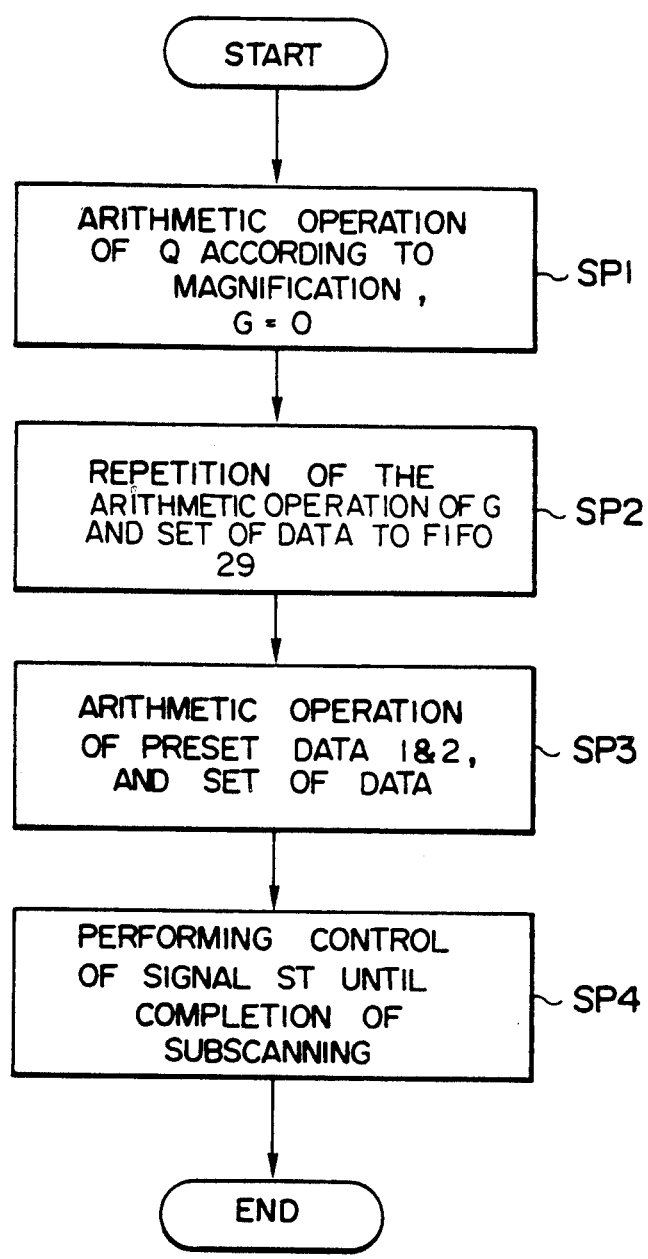

IMAGE READING APPARATUS USING A MOTOR AND CONTROLLING DRIVING PULSES SUPPLIED TO THE MOTOR

BACKGROUND OF THE INVENTION

1. Field of the Invention

The present invention relates to an image reading apparatus for reading an original document with a linear image sensor such as a charge-coupled device.

2. Related Background Art

In conventional facsimile apparatus, intermittent subscanning operation in reading an original document is achieved by moving the document or a linear image sensor with a stepping motor.

Such facsimile apparatus is provided with functions such as varying the image reading density or reducing the original image. More specifically, in a structure in which the subscanning operation is conducted by moving the linear image sensor or the original document by a stepping motor in a direction substantially perpendicular to the main scanning direction, or perpendicular to the direction of array of the linear image sensor, a variation in the image magnification or in the image density in the subscanning direction is achieved by controlling the pulses supplied to said stepping motor.

In this manner the variation in image density or in image size has been achieved by changing the frequency of driving pulses for the stepping motor or by mechanically changing the subscanning speed. However, such a method does not allow one to obtain an arbitrary image size or density, because of limitations on the selectable pulse frequency or on the mechanism.

FIG. 1 illustrates an example of an original reading apparatus utilizing a linear image sensor.

A contact-type linear image sensor 1, having a plurality of photosensor elements arranged over the original reading width, and an exposure light source 2 constitute an optical system 3, which is driven by a driving system consisting of a stepping motor 5, a driving belt 6, a pulley 7 and another pulley 8, in a subscanning direction perpendicular to a main scanning direction, equal to the direction in which the array of the photosensor elements extends, thereby reading an original document placed, with the image-bearing face thereof downwards, on an original support glass plate 4.

In the continuous movement of the optical system through continuous rotation of the stepping motor 5, the frequency of driving pulses therefor, or the scanning speed, is selected to be lower in order to achieve an enlarged or high-density image reading. On the other hand, the frequency of said driving pulses or the scanning speed is selected to be higher in order to achieve a reduced or low-density image reading.

However, in applications where intermittent feeding is required, such as the facsimile apparatus, a simple change in the frequency is unable to provide a satisfactory change in the image size or density, because of possible effects on the obtained image, unless the intermittent movement of the optical system is synchronized with the cycles of charge accumulating operations of the linear image sensor.

This is shown in more detail in FIG. 2.

In FIG. 2, it is assumed that the contact-type linear image sensor 1 carries out accumulation of photoinduced charges at a constant pitch as shown by (1)–(4), and accumulation of photoinduced charges during the movement of the optical system is effective. FIG. 2 shows a case where the optical system is stopped during an accumulating period (3), but the duration of charge accumulation does not coincide with the start and stop of the optical system as indicated by (a) and (b) since the phases of the driving pulses are not synchronized with the charge accumulating operation of the contact-type linear image sensor 1.

The image signal obtained in the accumulating period (3) is discarded, so that the image data obtained in the period (a) are lost and the image quality is therefore reduced.

Also in the accumulating period (4), the amount of movement is decreased by the period (b) so that the image quality is again reduced.

In this manner the phases of the driving pulses for the stepping motor 5 have to be synchronized with the charge accumulating operations of the contact-type linear image sensor 1 in order to obtain a satisfactory image quality.

However, for example in an optical system in which three pulses are given to the stepping motor 5 during an accumulating operation of the linear image sensor 1 for reading the image in actual size, an enlarged image reading of 150% requires a movement of the optical system corresponding to 1.5 pulses during an accumulating operation, so that the phases of the driving pulses for the stepping motor cannot be matched with the charge accumulating operations of the image sensor in a case of intermittent movement. For this reason it has been difficult to obtain an arbitrary image magnification or image density in the use of a stepping motor.

SUMMARY OF THE INVENTION

In consideration of the foregoing, an object of the present invention is to provide an image reading apparatus capable of satisfactorily reading an original image.

Another object of the present invention is to provide an image reading apparatus capable of image reading with an arbitrary image magnification.

Still another object of the present invention is to provide an image reading apparatus capable of arbitrarily varying the image reading density.

Still another object of the present invention is to effect satisfactory image reading and to obtain an image signal without deterioration in image quality in an image reading apparatus in which an original image is read through a relative movement of a linear image sensor and an original document, and this is achieved by providing an image reading apparatus capable of synchronizing the driving pulses for the stepping motor with the synchronization signal for the charge accumulating operation of the linear image sensor.

Still another object of the present invention is to effect satisfactory image reading and to obtain an image signal without deterioration in image quality in an image reading apparatus in which an original image is read through a relative movement of a linear image sensor and an original document, and this object is achieved by providing an image reading apparatus capable of controlling the frequency of driving pulses supplied to the stepping motor during a charge accumulating period according to the image reading magnification or image reading density.

Still another object of the present invention is to effect satisfactory image reading and to obtain an image signal without deterioration in image quality in an image reading apparatus in which a original image is read through a relative movement of a linear image sensor and an original document, and this is achieved by an image reading apparatus in which the number of pulses supplied to the stepping motor during a charge accumulating period of the linear image sensor is corrected according to a cumulative error between the number of pulses to be supplied to the stepping motor for achieving a relative movement of a certain distance and the actual number of pulses.

BRIEF DESCRIPTION OF THE DRAWINGS

FIG. 1 is a schematic view of an original image reading apparatus;

FIG. 2 is a timing chart showing a conventional image reading operation with a stepping motor;

FIG. 7 is a flow chart showing the control sequence of the stepping motor.

DETAILED DESCRIPTION OF THE PREFERRED EMBODIMENTS

Figure 3:
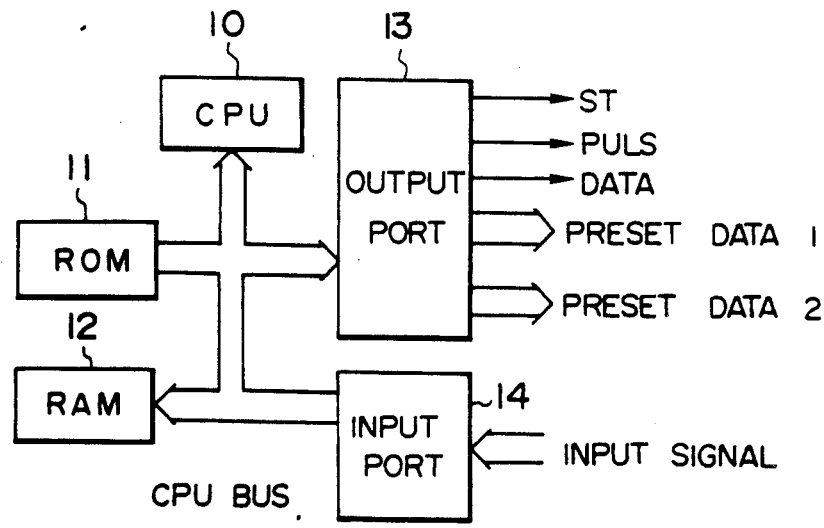
FIG. 3 is a block diagram of a control unit for controlling the function of a stepping motor according to the present invention.

Now the present invention will be clarified in greater detail by reference to the preferred embodiment, shown in the attached drawings.

At first there will be explained an algorithm for forming driving pulses for a stepping motor.

In the following explanation, A/B indicates the image magnification in the subscanning direction, wherein A and B are positive integers, P is a positive integer indicating the number of driving pulses required to be supplied to the stepping motor for reading a line of image with magnification of one (A/B=1), and Q is a positive integer indicating the actual number of driving pulses.

In the present embodiment, an operation circuit achieves a control to release Q or Q+1 pulses in an image reading line, thereby attaining a positional precision of one pulse or less in the subscanning direction for a given image magnification. The number of said pulses is identified through an integer operation in the following algorithm.

The error d in the subscanning of a line is represented by:

$$d = P \cdot B / A - Q \quad (1)$$

wherein:

$$0 \leq d < 1$$

Consequently the cumulative error in an m-th line is represented by:

$$m \cdot d = (P \cdot B / A - Q) \cdot m \quad (2)$$

wherein m is a positive integer.

In order to reduce the cumulative error, said error m·d is represented by variables $f_m$ and $g_m$ and the number of pulses supplied to the stepping motor is controlled according to said variables in the following manner:

$$m \cdot d = f_m + g_m \quad (3)$$

wherein: $f_m$ is a non-negative integer;

$$0 \leq g_m < 1$$

$$f_0 = g_0 = 0$$

and the variables $f_{m+1}$ and $g_{m+1}$ for a (m+1)-th line are determined from the values of $f_m$ and $g_m$ in the preceding m-th line in the following manner;

(1) if $0 \leq g_m + d < 1$;

$$f_{m+1} = f_m$$

$$g_{m+1} = g_m + d \quad (4)$$

(2) if $g_m + d \geq 1$;

$$f_{m+1} = f_m + 1$$

$$g_{m+1} = g_m + d - 1 \quad (5)$$

It is thus rendered possible to retain the cumulative error resulting from a change in the image magnification in the subscanning direction to one pulse or less, by supplying Q pulses to the stepping motor for driving the subscanning direction and Q+1 pulses for the (m+1)-th line only when the variable f is increased by one from the preceding line (foregoing case (2)).

In the following explained is a procedure for executing the above-explained algorithm through integer operations.

By multiplying both sides of the relation for determining the number of pulses by A:

$$g_m + d \geq 1 \quad (6)$$

we obtain:

$$A(g_m + d) \geq A$$

By substitution of the equation (1), there is obtained:

$$A(g_m + P \cdot B / A - Q) \geq A, \text{ or}$$

$$A \cdot g_m + P \cdot B - Q \cdot A \geq A \quad (7).$$

Thus the integer operation for determining the number of pulses can be facilitated by introducing a variable:

$$G_m = A \cdot g_m \quad (8)$$

Thus, for each required image magnification A/B, there are calculated:

$$Q = INT(P \cdot B / A) \quad (10) \text{ and}$$

$$D = P \cdot B - Q \cdot A \quad (11)$$

and a discrimination is made, for $G_0 = 0$:

$$G_m + D \geq A$$

If this discrimination turns out true $(G_m + D \geq A)$, the value of $G_{m+1}$ is determined as:

$$G_{m+1} = G_m + D - A$$

thereby supplying Q+1 pulses to the stepping motor for the subscanning of the (m+1)-th line.

On the other hand, if said discrimination turns out false ($0 \leq G_m + D < A$), the value of $G_m + 1$ is determined by:

$$G_{m+1} = G_m + D$$

so that Q pulses are supplied to the stepping motor for the subscanning of the (m+1)-th line.

The above-mentioned determination of the number of pulses for each image reading line and the control of the stepping motor according to said pulses allows one to synchronize the start and stop of intermittent movement of the optical system with the charge accumulating period of the linear image sensor, and to reduce the error in the subscanning direction in the use of a stepping motor.

The foregoing description relates to a case of changing the image magnification, but the same procedure is applicable also to a change in the image reading density in the subscanning direction, by letting the symbols represent the following meanings:
  A: desired pixel density;
  B: standard pixel density;
  P: number of driving pulses required for an image reading line for a standard pixel density; and
  Q: actual number of driving pulses.

In the following there will be given on explanation on an embodiment of control utilizing the aboveexplained algorithm, shown in FIGS. 3 to 7.

FIG. 3 is a block diagram of a control unit equipped with a CPU 10, composed of a microcomputer for effecting a calculation according to the aboveexplained algorithm and adapted for controlling the operation of the image reading apparatus shown in FIG. 1.

The CPU 10 executes control operations, according to a control program stored in a read-only memory (ROM) 11 and utilizing a random access memory (RAM) 12.

An output port 13 releases various signals for controlling the stepping motor 5, in response to instructions of the CPU 10. The output signals from the output port 13 include a start signal ST for starting an image reading operation in response to an external request for data; a data signal DATA for instructing the frequency of pulses for the stepping motor for each line; a pulse signal PULS synchronized with said signal DATA; and preset data 1 and 2 indicating the frequencies of the pulses for the stepping motor corresponding to the image reading magnifications.

An input port 14 receives, for example, input signals from an unrepresented operation unit; a home position sensor signal indicating that the optical system is located at a start position; a magnification signal indicating the image reading magnification B/A; and a signal indicating whether a communication control unit requires the obtained image data in case the image reading apparatus constitutes a facsimile apparatus.

In FIG. 3 there are omitted signals not directly related to the present invention, such as a reverse control signal for returning the optical system to the home position.

Figure 4:
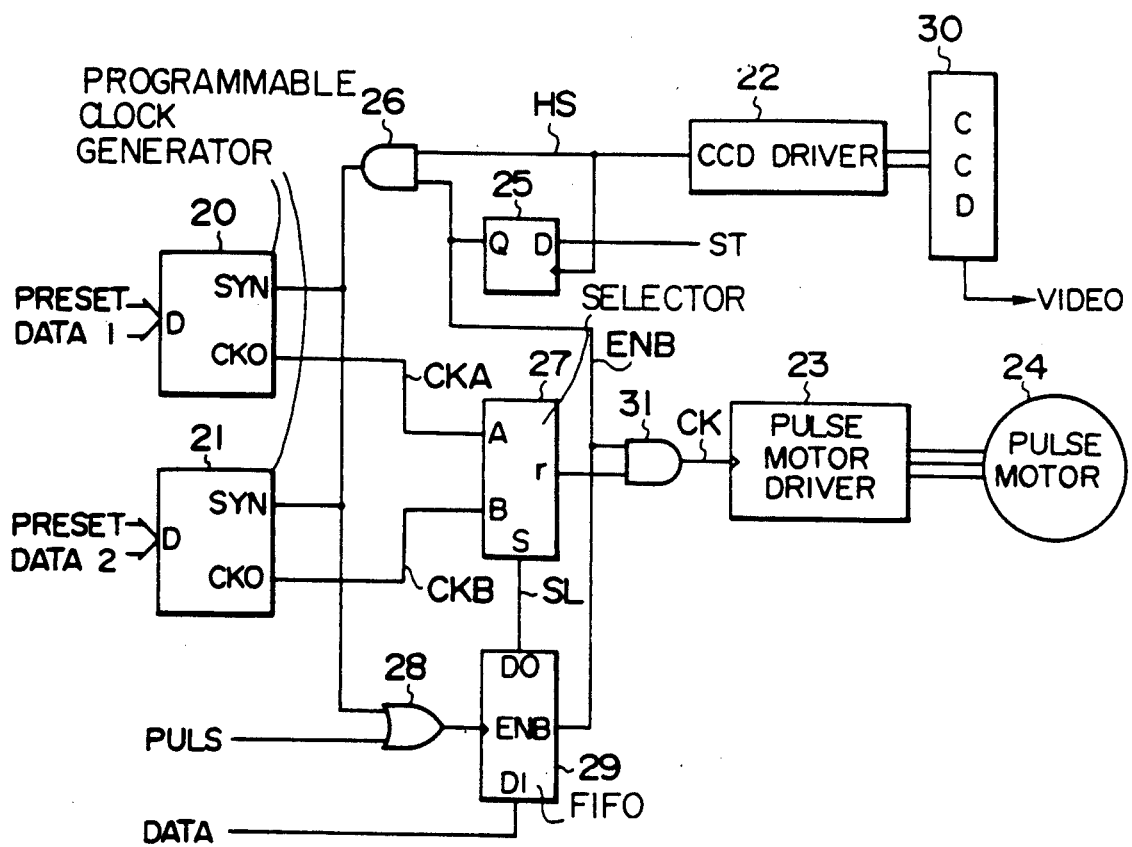
FIG. 4 is a block diagram of an example of a driving circuit of the stepping motor.

FIG. 4 is a detailed circuit diagram for driving the stepping motor 5 in response to an instruction from the output port 13 shown in FIG. 3.

A charge-accumulating linear image sensor or CCD 30 corresponds to the contact-type linear image sensor 1 shown in FIG. 1, and a stepping motor 24 corresponds to the stepping motor 5 shown in FIG. 1. The CCD 30 has a linear array of plural photosensor elements, and is moved in a subscanning direction substantially perpendicular to a main scanning direction (which is the same as the direction in which said array extends), by means of the stepping motor 24.

The CCD 30 driven by a CCD driver 22, accumulates charges corresponding to the light reflected from the original document and generates a serial image signal VIDEO of each line corresponding to the accumulated charges. Also the CCD driver 22 generates a signal HS shown in FIG. 6, which is a section signal defining the charge accumulating period of the CCD 30 and is repeatedly released at an interval determined for example by the photoelectric converting characteristic of the CCD 30.

Figure 6:
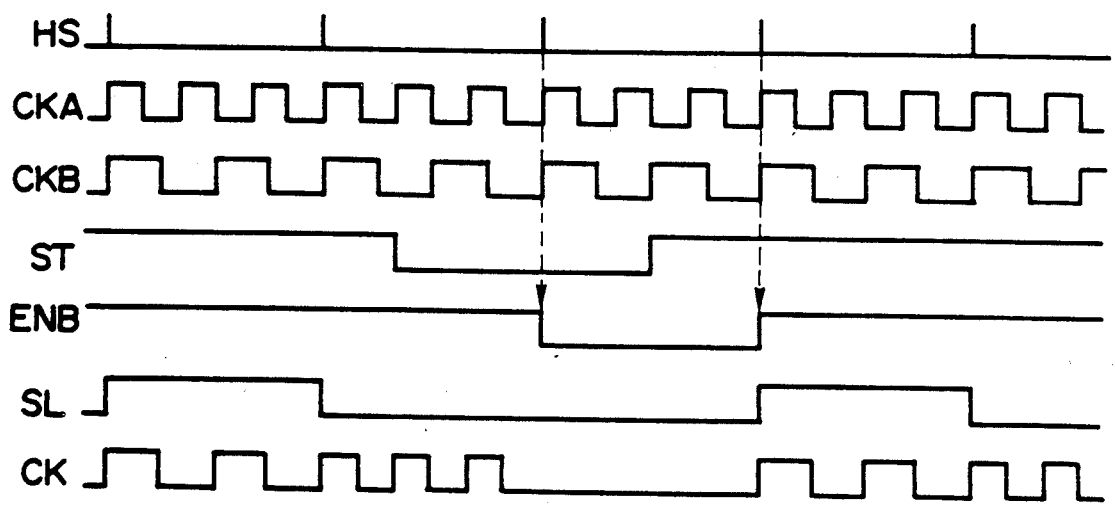
FIG. 6 is a timing chart showing the signals of various units.

A D-type flip-flop 25 is used for synchronizing the start signal ST released from the output port 13 with the signal HS. If the CPU 10 releases the signal ST during the period of said signal HS, a signal ENB synchronized with the signal HS is generated from flip-flop 25 as shown in FIG. 6.

An AND gate 26 transmits the signal HS only during the period of the signal ENB and prevents the entry of the signal HS into a first-in-first-out memory (FIFO) 29 through an OR gate 28 at a data setting into said FIFO 29 from the control unit.

Programmable block generators 20, 21 are used for respectively receiving preset data 1 and 2 released from the output port 13 and utilized for determining the frequency of the driving pulses for the stepping motor corresponding to the image reading magnification, and respectively releasing, from terminals CKO thereof, clock signals CKA, CKB of different frequencies synchronized in phase with the charge accumulating period of the CCD and also synchronized with the entry of a signal SYN, corresponding to the signal HS in the effective period of the signal ENB, to synchronization terminals SYN. In the present embodiment, three pulses PKA and two pulses PKB are released during the charge accumulating period of the CCD.

A selector 27 selects the clock signal CKA or CKB released from the programmable clock generator 20, 21, respectively at a high- or low-level state of a signal SL released from the FIFO 29.

The FIFO 29 stores the signal DATA supplied from the CPU 10 in synchronization with the pulse signal PULS when the terminal ENB is at a disabled state, and releases the signal SL for the selector 27 according to the stored signal DATA in synchronization with the signal HS from the AND gate 26, when the terminal ENB is at an enable state.

An AND gate 31 prohibits the supply of the clock signal from the selector 27 to the stepping motor driver 23 when the terminal ENB is at the disabled state. FIG. 6 shows various signals in the circuit shown in FIG. 4.

Figure 5:
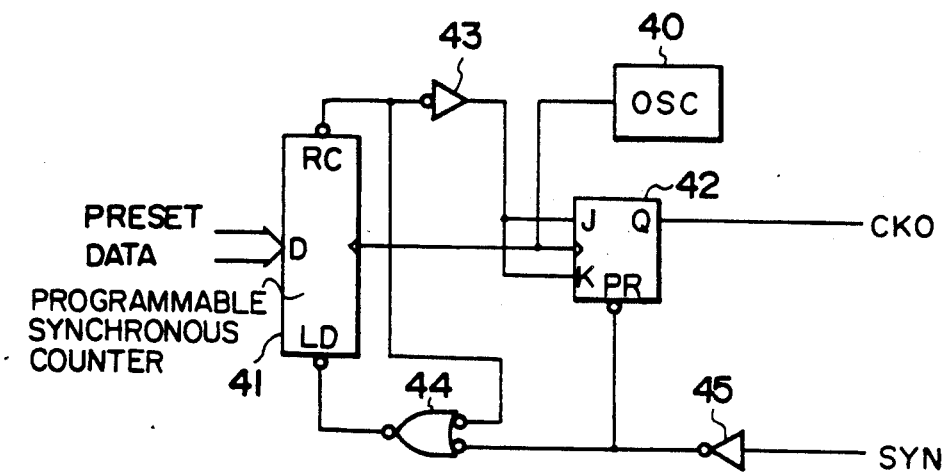
FIG. 5 is a block diagram of an example of a programmable block generator.

FIG. 5 is a detailed circuit diagram of the programmable clock generator 20 or 21, shown in FIG. 4, which are of a same structure.

An oscillator 40 generates a clock signal of a reference frequency, utilized as the basis of the driving pulses for the stepping motor. Said reference frequency is a fixed frequency, corresponding to 10 or 100 times of the frequency of said driving pulses.

A programmable synchronous counter 41 with a preset input is loaded with the preset data when a terminal LD is at an enable state, and starts a count-down operation from said preset data in synchronization with the clock signal from the oscillator 40, when said terminal LD is at a disabled state.

Said counter releases a ripple clock from a terminal RC when the count reaches zero. It therefore represents the start and end timings of the clock signal by said ripple clock pulses, by setting data corresponding to a half of the repeating period of clock signal of a desired frequency.

Said ripple clock signal is inverted by an inverter 43 and is utilized for inverting the output signal Q of a JK-type flip-flop 42. Thus, said flip-flop 42 generates a clock signal CKO of a frequency corresponding to the preset data. Also said ripple clock signal is supplied through an AND gate 44 and is used as a load signal for the counter 41.

The counting operation of the counter 41 and the Q-output signal of the flip-flop 42 are synchronized in phase by a signal SYN supplied through an inverter 45.

In this manner there is obtained an output clock signal of a duty ratio of 50% and of a desired frequency for driving the stepping motor, synchronized in phase with the charge accumulating period of the CCD 30 by said signal SYN.

It is therefore rendered possible to achieve a subscanning operation of the optical system with a speed corresponding to the image reading magnification by presetting data corresponding thereto.

FIG. 7 shows a schematic flow chart of the function of the CPU 10 shown in FIG. 3.

At first a step SP 1 calculates the value Q in the aforementioned algorithm according to the image magnification and initializes the value of G.

Then a step SP 2 repeats the procedure of said algorithm to calculate $G_m$, and sets the FIFO 29 to select the output CKA or CKB from the clock generator 20 or 21, according to the value of $G_m$ thus determined.

A step SP 3 calculates and sets preset data 1, 2 each corresponding to a half of the cycle of the clock pulses in the programmable clock generators 20, 21 so as to obtain Q or Q+1 clock pulses in a charge accumulating period defined by the signal HS. In this manner the image reading operation is enabled.

A step SP 4 controls the start signal ST as shown in FIG. 6, until the completion of the subscanning operation.

In this manner there is obtained an image reading process allowing to select an arbitrary image reading magnification or density, by controlling the driving pulses for the stepping motor according to a predetermined algorithm.

More specifically, a deterioration in the image quality is prevented by supplying the stepping motor with integral Q or Q+1 driving pulses for each scanning line, in synchronization with the charge accumulating operation of the linear image sensor, utilizing a phenomenon that a slight change in the image reading area is not noticeable to the human eyes.

Besides the number of pulses supplied to the stepping motor is determined through simple integer calculations, and the positional error of the image sensor from the correct reading position is retained within an amount of movement of the stepping motor corresponding to one pulse.

Also as will be evident from the timing chart shown in FIG. 6, a faithful image reading operation is assured since the predetermined movement of the optical system is just completed in the charge accumulating period of the linear image sensor even in case of an arbitrary change in the image magnification or image density. Besides a faithful image reading operation is ensured as the phase synchronization of the driving pulses for the stepping motor is controlled by the synchronization signal for the charge accumulating operation of the linear image sensor.

In the foregoing embodiment the optical system is displaced with respect to a fixed original document, but the present invention is also applicable to an image reading apparatus in which the optical system is fixed and the original document is moved for example by a motor driven by a stepping motor. The image signal obtained by image reading is for example transmitted to an external printed through a transmitting device or supplied to a processing unit such as a computer.

In the foregoing embodiment explanation has been limited to the change in the image magnification or image density in the subscanning direction, but such change in the main scanning direction can be achieved by skipping or expanding the output signal of the linear image sensor according to the rate of change of the image magnification or image density.

As explained in the foregoing, it is rendered possible to achieve subscanning operation synchronized with the charge accumulating operation and thus to achieve satisfactory image reading without lack in the read image, since the phase synchronization of the driving pulses for the stepping motor is controlled by the synchronization signal for the charge accumulating operation of the linear image sensor.

Also it is rendered possible to securely achieve a subcanning operation of a predetermined distance according to the image reading magnification or density within a charge accumulating period specific to the linear image sensor, since the frequency of the driving pulses supplied to the stepping motor within the charge accumulating period of the linear image sensor is controlled according to the image reading magnification or density.

Furthermore, it is rendered possible to achieve satisfactory image reading without deterioration in image quality and with an arbitrary image magnification or density, since the number of driving pulses supplied to the stepping motor within the charge accumulating period of the linear image sensor is corrected according to a cumulative error between the number of pulses to be supplied to the stepping motor for achieving a relative movement of a predetermined distance and the actual number of driving pulses.

Though the present invention has been explained by a preferred embodiment thereof, the present invention is by no means limited to such embodiment but is subject to various modifications and variations within the scope and spirit of the appended claims.

I claim:

1. An image reading apparatus comprising:
    charge-accumulating image reading means for reading an original image, said image reading means periodically repeating a charge accumulating operation;
    moving means for moving an image reading position of said image reading means with a stepping motor;

determining means for determining plural sets of numbers of pulses to be supplied to said stepping motor according to an image reading magnification or an image reading density with which said image reading means is to read said original image; and selecting means for selecting one of the plural sets of numbers of pulses in accordance with the progress of the charge accumulating operation of said image reading means; and supplying means for supplying pulses to said stepping motor, said supplying means supplying the number of pulses in a selected one of the plural sets to said stepping motor during a respective charge accumulating operation of said image reading means.

2. An image reading apparatus according to claim 1, wherein said determining means comprises first generator means for generating pulses of a first frequency and second generator means for generating pulses of a different second frequency.

3. An image reading apparatus according to claim 2, wherein said selecting means selects either one of said first and second generator means in accordance with the progress of the charge accumulating operation of said image reading means.

4. An image reading apparatus according to claim 1, wherein said supplying means is adapted to control phase of the pulses supplied to said stepping motor in synchronization with the charge accumulating operation of said image reading means.

5. An image reading apparatus according to claim 1, wherein said moving means is adapted to move the image reading position of said image reading means by an amount corresponding to the number of pulses supplied to said stepping motor.

6. An image reading apparatus according to claim 1, wherein said image reading means comprises a contact-type linear image sensor.

7. An image reading apparatus according to claim 1, wherein said image reading means repeats the charge accumulating operation at a predetermined period.

8. An image reading apparatus comprising:
image reading means for reading an original image;
moving means for moving an image reading position of said image reading means with a stepping motor; and
control means for controlling a number of pulses supplied to said stepping motor according to a cumulative error between a number of pulses which must be supplied to said stepping motor for moving the image reading position by a predetermined amount and the number of pulses actually supplied to said stepping motor.

9. An image reading apparatus according to claim 8, wherein said control means comprises first generator means for generating pulses of a first frequency and second generator means for generating pulses of a different second frequency.

10. An image reading apparatus according to claim 8, wherein said moving means is adapted to move the image reading position of said image reading means by an amount corresponding to the number of pulses supplied to said stepping motor.

11. An image reading apparatus according to claim 8, wherein said control means is adapted to control the number of pulses supplied to said stepping motor according to an image reading magnification or an image reading density with which said image reading means is to read said original image.

12. An image reading apparatus according to claim 8, wherein said image reading means comprises a charge-accumulating image sensor.

13. An image reading apparatus according to claim 12, wherein said image reading means repeats a charge accumulating operation at a predetermined period.

14. An image reading apparatus comprising:
charge-accumulating image reading means for reading an original image, said image reading means periodically repeating a charge accumulating operation;
moving means for moving an image reading position of said image reading means with a stepping motor;
determining means for determining plural frequencies of pulses to be supplied to said stepping motor according to an image reading magnification or an image reading density with which said image reading means is to read said original image;
selecting means for selecting one of the plural frequencies of pulses in accordance with the progress of the charge accumulating operating of said image reading means; and
supplying means for supplying pulses to said stepping motor, said supplying means supplying pulses having a selecting one of the plural frequencies to said stepping motor during a respective charge accumulating operation of said image reading means.

15. An image reading apparatus according to claim 14, wherein said determining means comprises first generator means for generating pulses of a first frequency and second generator means for generating pulses of a different second frequency.

16. An image reading apparatus according to claim 15, wherein said selecting means selects either one of said first and second generator means in accordance with the progress of the charge accumulating operation of said image reading means.

17. An image reading apparatus according to claim 15, wherein said supplying means is adapted to control a phase of the pulses supplied to said stepping motor in synchronism with the charge accumulating operation of said image reading means.

18. An image reading apparatus according to claim 14, wherein said moving means is adapted to move the image reading position of said image reading means by an amount corresponding to the number of pulses supplied to said stepping motor.

19. An image reading apparatus according to claim 14, wherein said image reading means comprises a contact-type linear image sensor.

20. An image reading apparatus according to claim 14, wherein said image reading means repeats the charge accumulating operation at a predetermined period.

* * * * *

UNITED STATES PATENT AND TRADEMARK OFFICE
CERTIFICATE OF CORRECTION

PATENT NO. : 4,992,888

DATED : February 12, 1991

INVENTOR(S) : Nao Nagashima

It is certified that error appears in the above-identified patent and that said Letters Patent is hereby corrected as shown below:

COLUMN 1

Line 65, "photoin-" should read --photo-in- --; and
    Line 67, "photoinduced charges" should read --photo-induced charges--.

COLUMN 2

Line 68, "a" should read --an--.

COLUMN 4

Line 34, "explained is" should read --is explained--.

COLUMN 5

Line 31, "on explanation on" should read --an explanation of--;
    Line 32, "aboveexplained" should read --above-explained--; and
    Line 36, "aboveexplained" should read --above-explained--.

UNITED STATES PATENT AND TRADEMARK OFFICE
CERTIFICATE OF CORRECTION

PATENT NO. : 4,992,888

DATED : February 12, 1991

INVENTOR(S) : Nao Nagashima

It is certified that error appears in the above-identified patent and that said Letters Patent is hereby corrected as shown below:

COLUMN 6

Line 57, "AND gate 31" should read --AND gate 30--.

COLUMN 7

Line 60, "a" should read --the--; and
    Line 63, "Besides" should read --Besides,--.

COLUMN 8

Line 19, "printed" should read --printer--.

COLUMN 10

Line 33, "selecting" should read --selected--; and
    Line 43, "and" should read --or--.

Signed and Sealed this

Eighth Day of December, 1992

*Attest:*

DOUGLAS B. COMER

*Attesting Officer*      *Acting Commissioner of Patents and Trademarks*